US011284255B1

(12) United States Patent
Akkaya et al.

(10) Patent No.: US 11,284,255 B1
(45) Date of Patent: Mar. 22, 2022

(54) SYSTEMS AND METHODS FOR DISTRIBUTED AUTHENTICATION OF DEVICES

(71) Applicants: The Florida International University Board of Trustees, Miami, FL (US); Battelle Energy Alliance, LLC, Idaho Falls, ID (US)

(72) Inventors: Kemal Akkaya, Miami, FL (US); Arupjyoti Bhuyan, Idaho Falls, ID (US); Mai A. M. Abdelmalek, Miami, FL (US)

(73) Assignees: THE FLORIDA INTERNATIONAL UNIVERSITY BOARD OF TRUSTEES, Miami, FL (US); BATTELLE ENERGY ALLIANCE, LLC, Idaho Falls, ID (US)

( * ) Notice: Subject to any disclaimer, the term of this patent is extended or adjusted under 35 U.S.C. 154(b) by 0 days.

(21) Appl. No.: 17/241,257

(22) Filed: Apr. 27, 2021

(51) Int. Cl.
*H04W 12/06* (2021.01)
*H04L 9/32* (2006.01)
*H04L 29/06* (2006.01)

(52) U.S. Cl.
CPC .......... *H04W 12/06* (2013.01); *H04L 9/3247* (2013.01); *H04L 63/0435* (2013.01)

(58) Field of Classification Search
CPC ... H04W 12/06; H04L 63/0435; H04L 9/3247
See application file for complete search history.

(56) References Cited

U.S. PATENT DOCUMENTS

| 2020/0099522 | A1* | 3/2020 | Yang | B60R 25/241 |
| 2021/0044972 | A1* | 2/2021 | Murray | H04L 9/3271 |

* cited by examiner

*Primary Examiner* — Khoi V Le
(74) *Attorney, Agent, or Firm* — Saliwanchik, Lloyd & Eisenschenk (57) ABSTRACT

A lightweight, fast, and reliable authentication mechanism compatible with the 5G D2D ProSe standard mechanisms is provided. A distributed authentication with a delegation-based scheme avoids repeated access to the 5G core network key management functions. Hence, a legitimate user equipment device (e.g., a drone) is authorized by the cellular network (e.g., 5G cellular network) via offering a proxy signature to authenticate itself to other drones. Test results demonstrate that the protocol is lightweight and reliable.

20 Claims, 6 Drawing Sheets

SYSTEMS AND METHODS FOR DISTRIBUTED AUTHENTICATION OF DEVICES

GOVERNMENT SUPPORT

This invention was made with government support under Award Number DE-AC07-05ID14517 awarded by Department of Energy (DOE). The government has certain rights in the invention.

BACKGROUND

The 5G cellular network will integrate Internet of Things (IoT) features and services toward a highly connected and informative communication experience. 5G connected devices include sensors and drones for better on-site data collection and end-user experience. Device to device (D2D) direct communication among 5G connected devices is an important capability for groups of IoT devices such as a swarm of drones or a group of sensors. For instance, drones can use direct communication for data exchange among a swarm of drones without involvement of the cellular base stations and the rest of the network. The LTE Advanced/LTE-A, along with 5G, incorporates a D2D communication standard to allow User Equipment (UE) in the same area to communicate together. This standard is called Proximity-based Services (ProSe) D2D, which provides several features that may be deployed jointly or independent of each other.

However, with all the expected data sensing and collection that IoT devices will bring to the future 5G networks, this will also create massive potential for security breaches or malicious attacks. IoT devices, such as drones, are vulnerable to various security threats due to their limited resources. For instance, a malicious drone can act as a legitimate relay or a gateway to a set of drones and collect critical data from those drones. Therefore, drone security mechanisms during D2D communication need to be carefully designed to meet the application requirements and ensure safe communication. While there exists some recent research work for addressing the drone security challenges, these approaches are mainly designed for ad-hoc wireless networks, which would bring additional messages and overhead to the cellular network core. On the other hand, the LTE-A ProSe services have their own customized security standards and a full key exchange protocol to secure D2D communication. However, this standard does not apply to newly developed 5G ProSe. Its security extensions are still under development, which opens a wide area for research and contribution. It is important to note that even if the existing 4G ProSe security solution would be adapted to the 5G network, there will still be high traffic toward the core network because of the 4G ProSe continuous access to the key management function server within the core network.

5G is the beginning of a new era in cellular communication, bringing up a highly connected network with the incorporation of the IoT. In order to flexibly operate all the IoT devices over a cellular network, the D2D communication standard was developed. However, IoT devices such as drones utilizing 5G D2D services could be a perfect target for malicious attacks as they pose several safety threats if they are compromised. Further, there will be heavy traffic with an increased number of IoT devices connected to the 5G network.

Attacks or conditions that interrupt the wireless connectivity to automated and connected devices can lead to disastrous consequences including fatalities (e.g., death of patients supported by connected health and accidents involving automated vehicles and drones). Inability to use drones to aid recovery and rescue operation can hamper public safety efforts seriously. Disruption of automated industries can lead to economic turmoil worldwide. As 5G is being deployed, its security features are still evolving. D2D communication security solutions are often based on the assumption that they will connect UE devices, overlooking the consequences of unattended IoT devices that can potentially utilize D2D in various contexts.

BRIEF SUMMARY

Embodiments of the subject invention provide novel and advantageous configuration and security systems and methods for a group of devices to authenticate themselves to become part of a self-organized local Internet of Things (LIoT) network with the ability for device to device (D2D) communication within the group. These devices can already be part of a larger network, such as the 5G cellular network, and hence have undergone normal authentication procedures for that network.

In an embodiment, a system for distributed authentication of devices to create a local internet of things connected to a cellular network can comprise: a first device having a first processor, a first device public key, and a first device private key; a second device having a second processor, a second device public key, and a second device private key; a first machine-readable medium in operable communication with the first processor and having first instructions stored thereon that, when executed by the first processor, perform the following steps: 1a) receiving, by the first processor from the cellular network (e.g., from a 5G core-network that is a component of a 5G network, such as the cellular network), a first warrant, a first delegation parameter, and a core public key (e.g., a 5G core public key); 1b) calculating, by the first processor based on the first warrant, the first delegation parameter, and the core public key: a first public delegation key, a first private delegation key, a first timestamp, and a first signature; and 1c) sending, by the first device to the second device, a first proxy signature message comprising the first timestamp, the first signature, the first warrant, the first public delegation key, and the first device public key; and a second machine-readable medium in operable communication with the second processor and having second instructions stored thereon that, when executed by the second processor, perform the following steps: 2a) receiving, by the second processor from the cellular network, a second warrant, a second delegation parameter, and the core public key; 2b) calculating, by the second processor based on the second warrant, the second delegation parameter, and the core public key: a second public delegation key, a second private delegation key, a second timestamp, and a second signature; 2c) sending, by the second device to the first device, a second proxy signature message comprising the second timestamp, the second signature, the second warrant, the second public delegation key, and the second device public key; 2d) receiving, by the second device from the first device, the first proxy signature message comprising the first timestamp, the first signature, the first warrant, the first public delegation key, and the first device public key; and 2e) verifying, by the second device, the first proxy signature message. The cellular network can be a 5G cellular network.

The first instructions when executed by the first processor can further perform the following additional steps: 1d) receiving, by the first device from the second device, the second proxy signature message comprising the second timestamp, the second signature, the second warrant, the second public delegation key, and the second device public key; and 1e) verifying, by the first device, the second proxy signature message. The system can further comprise: a third device having a third processor, a third device public key, and a third device private key; and a third machine-readable medium in operable communication with the third processor and having third instructions stored thereon that, when executed by the third processor, perform the following steps: 3a) receiving, by the third processor from the cellular network, a third warrant, a third delegation parameter, and the core public key; 3b) calculating, by the third processor based on the third warrant, the third delegation parameter, and the core public key: a third public delegation key, a third private delegation key, a third timestamp, and a third signature; and 3c) sending, by the third device to the first device, a third proxy signature message comprising the third timestamp, the third signature, the third warrant, the third public delegation key, and the third device public key. The third instructions when executed by the third processor further performing the following steps: 3d) receiving, by the third device from the first device, the first proxy signature message comprising the first timestamp, the first signature, the first warrant, the first public delegation key, and the first device public key; and 3e) verifying, by the third device, the first proxy signature message. The system can further comprise: a fourth device having a fourth processor, a fourth device public key, and a fourth device private key; and a fourth machine-readable medium in operable communication with the fourth processor and having fourth instructions stored thereon that, when executed by the fourth processor, perform the following steps: 4a) receiving, by the fourth processor from the cellular network, a fourth warrant, a fourth delegation parameter, and the core public key; 4b) calculating, by the fourth processor from the values of the fourth warrant, the fourth delegation parameter, and the core public key: a fourth public delegation key, a fourth private delegation key, a fourth timestamp, and a fourth signature; 4c) sending, by the fourth device to the first device, a fourth proxy signature message comprising the fourth timestamp, the fourth signature, the fourth warrant, the fourth public delegation key, and the fourth device public key; 4d) receiving, by the fourth device from the first device, the first proxy signature message comprising the first timestamp, the first signature, the first warrant, the first public delegation key, and the first device public key; and 4e) verifying, by the fourth device, the first proxy signature message. The first instructions when executed by the first processor can further perform the following steps: 1f) calculating, by the first processor, a first symmetric key; 1g) sending, by the first device to the second device, the first symmetric key; 1h) sending, by the first device to the third device, the first symmetric key; and 1i) sending, by the first device to the fourth device, the first symmetric key. The first device can be a leader device, and each of the second device, the third device, and the fourth device can be a swarm device. The leader device can be configured to connect and authenticate directly with the cellular network, and each respective swarm device can be configured to connect and authenticate directly with the leader device. The leader device can be a drone having a primary direct connection to the cellular network, and each respective swarm device can be a drone having reduced, restricted, intermittent, or no direct connection to the cellular network. The leader device can be configured to communicate directly with the core network on behalf of each swarm device, and each swarm device can be configured to prioritize communication with the leader device over direct communication with the cellular network.

In another embodiment, a method for delegation-based distributed authentication of devices can comprise: a) receiving, by a leader device ($D_L$) a first delegation message; b) creating, by $D_L$, a leader proxy signature private key ($xp_L$) and a leader proxy signature public key ($yp_L$); c) receiving, by a swarm device ($D_i$) a second delegation message; d) creating, by $D_i$, a swarm proxy signature private key ($xp_i$)) and a swarm proxy signature public key ($yp_i$); e) sending, by $D_L$, a proxy signature broadcast message; f) receiving, by $D_i$, the proxy signature broadcast message; g) verifying, by $D_i$, the proxy signature broadcast message; h) sending, by $D_i$, a proxy signature unicast message; i) receiving, by $D_L$, the proxy signature unicast message; and j) verifying, by $D_L$, the proxy signature unicast message.

The first delegation message can comprise a first unique warrant ($w_L$), a first pair of unique delegation parameters ($r_L$, $s_L$), and a core-network public key ($y_c$) (e.g., a 5G core-network public key); $D_L$ can have a leader private key ($x_L$) and a leader public key ($y_L$); both $xp_L$ and $yp_L$ can be derived from the first delegation message; $xp_L$ can be derived from $w_L$, $r_L$, $s_L$, and $x_L$; and $yp_L$ can be derived from $w_L$, $r_L$, $y_c$, and $y_L$. The second delegation message can comprise a second unique warrant ($w_i$), a second pair of unique delegation parameters ($r_i$, $s_i$), and the core-network public key ($y_c$); $D_i$ can have a swarm private key ($x_i$) and a swarm public key ($y_i$); both $xp_i$ and $yp_i$ can be derived from the second delegation message; $xp_i$ can be derived from $w_i$, $r_i$, $s_i$ and $x_i$; and $yp_i$ can be derived from $w_i$, $r_i$, $y_c$, and $y_i$. The proxy signature broadcast message can comprise a first timestamp ($t_L$), a first unique proxy signature ($\sigma_k$), the first unique warrant ($w_L$), the leader proxy signature public key ($yp_L$), and the leader public key ($y_L$). The first timestamp ($t_L$) can be a timestamp nonce using $x_L$, and $\sigma_L$ being derived from $t_L$ and $xp_L$. The step of verifying, by $D_i$, the proxy signature broadcast message can comprise application of a digital signature verification algorithm of the form:

$$V(t_1, \sigma_1, (y_c y_l)^{h(w_1, y_l)} yp_l) = \text{True}$$

where $h(w_1, y_1)$ is a collision resistant hash function. The proxy signature unicast message can comprise a second timestamp ($t_i$), a second unique proxy signature ($\sigma_i$), the second unique warrant ($w_i$), the proxy signature public key ($yp_i$), and the swarm public key ($y_i$). The second timestamp ($t_i$) can be a timestamp nonce using $x_i$, and $\sigma_i$ being derived from $t_i$ and $xp_i$. The step of verifying, by $D_L$, the proxy signature unicast message can comprise application of a digital signature verification algorithm of the form:

$$V(t_i, \sigma_i, (y_c y_i)^{h(w_i, y_i)} yp_i) = \text{True}$$

where $h(w_i, y_i)$ is a collision resistant hash function.

DETAILED DESCRIPTION

Embodiments of the subject invention provide novel and advantageous configuration and security systems and methods for a group of devices to authenticate themselves to become part of a self-organized local Internet of Things (LIoT) network with the ability for device to device (D2D) communication within the group. These devices can already be part of a larger network, such as the 5G cellular network, and hence have undergone normal authentication procedures for that network.

In an embodiment, a unique configuration and security method for a group of devices enables customized procedures for the devices to authenticate themselves to become part of a self-organized local Internet of Things (LIoT) network with the ability for D2D communication within the group. These devices are already part of a larger network, such as the 5G cellular network, and hence have undergone normal authentication procedures for that network. The configuration and security method for a group of devices can provide an extra level of security (e.g., additional security beyond potential future 3GPP standards specification for 5G Proximity Services.)

In an embodiment, a group of connected devices in physical proximity form an LIoT) that enables secure, resilient, and reliable localized operations while maintaining connection to a larger parent network, such as a 5G cellular network that provides connectivity to additional devices and networks. A framework, which adds customizable security authentication procedures for the LIoT to the existing security procedures of this parent network, can be provided. Certain embodiments utilize proxy signatures from cryptography so that when new devices connect to the LIoT, they may present a proxy signature to a leader device without any need to verify the signature with the 5G core and without the need to maintain symmetric keys for D2D devices. The number of connection requests from the leader device may be minimized. These signatures may be created in advance (e.g., when the IoT devices register with the 5G network.)

Embodiments provide lightweight, fast, and reliable authentication mechanisms compatible with the 5G D2D ProSe standard mechanisms. Specifically, a distributed authentication with a delegation-based scheme instead of repeated access to the 5G core network key management functions is provided. A legitimate drone is authorized by the core network via offering a proxy signature to authenticate itself to other drones. The provided protocol has been implemented in an ns-3 5G network simulator that supports 5G D2D-based communication. Computational calculations have also been conducted on the RaspberryPi3 IoT device to mimic exemplary drone calculation process and delays. The results demonstrate that the protocol is lightweight and reliable.

Embodiments of the subject invention target security challenges in the 5G D2D ProSe standard. One category of IoT devices that can utilize 5G services is the category of drones, and certain non-limiting examples follow that apply embodiments of the subject invention in the drone application context. Nevertheless, embodiments of the subject invention may also apply to other IoT devices in different domains, including but not limited to medical and vehicular networks. By way of a non-limiting exemplary embodiment a swarm-of-drones where only one of the drones (e.g., a leader drone) is within or actively using available cellular coverage (i.e., acting as a data relay) and other drones establish D2D links with this leader drone is provided. The leader drone may act as a UE-to-Network Relay between the 5G core network and some or all of the other drones in the swarm. Given the resource limitations of drones, mutual authentication of one or more leader drones and others in the swarm may provide an advantageous, efficient, and lightweight solution for scalable and robust authentication of multiple UEs.

Approaches following 4G ProSe security standards require access to the network core. Embodiments of the subject invention provide a solution that may minimize the message exchanges among the drones and the core network with a delegation-based authentication using proxy signatures. A proxy signature enables a party to delegate its authentication credentials to other parties while still providing the same security services as digital signatures (e.g., source authentication and message integrity). The proxy signer signs a message using a secret key of the original signer and its own private key as described by Das, et al. ("Algorithms and approaches of proxy signature: A survey," arXiv preprint cs/0612098, 12 2006; which is hereby incorporated herein by reference in its entirety) and Lee, et al. ("A new delegation-based authentication protocol for use in portable communication systems," IEEE Transactions on Wireless Communications, vol. 4, no. 1, pp. 57-64, 1 2005; which is hereby incorporated herein by reference in its entirety). Some embodiments of the subject invention may employ aspects similar to those found in the existing OpenID as described by Recordon et al. ("Openid 2.0: a platform for user-centric identity management," in Proceedings of the second ACM workshop on Digital identity management, 2006, pp. 11-16; which is hereby incorporated herein by reference in its entirety). Authentication mechanisms can rely on an OpenID server, which issues identities to be presented as evidence (e.g., a proxy signature) for authentication. However, embodiments of the subject invention can minimize the number of messages, amount of resource overhead, and/or traffic (e.g., by limiting access to the 5G Core Network.)

In an embodiment, after a mandatory 5G registration phase (e.g., a registration phase using procedures defined in Technical Specification (TS) Document 23.502, e.g., as listed at https://www.tech-invite.com/3m23/toc/tinv-3gpp-23-502_b.html#e-4-2-2-2-2; which is hereby incorporated herein by reference in its entirety), which may include an authentication (e.g., 5G-AKA Authentication Protocol), and a delegation phase may be added in which delegation parameters (e.g., warrant and proxy parameters) are used to derive proxy signature keys for an authentication process. Then, following a ProSe device discovery model, one or more swarm drones may detect other drones in the network for D2D communication. The ProSe discovery model may have at least two options: Model A and Model B. In Model A, a leader drone announces its existence in the network. In Model B, each drone sends a discovery message to the nearest drones. The authentication protocol in accordance with certain embodiments of the subject invention works with both models. The authentication process may be integrated into the discovery phase by attaching a drone's proxy signature and verifying the proxy signature by the receiving drones.

An embodiment of the subject invention has been tested as detailed in the example below, through implementation with the ns-3 5G network simulator under the D2D communication model (see also, e.g., Diouf, "mmWave cellular network simulator," https://github.com/makhtardiouf/d2d, June 2017; which is hereby incorporated herein by reference in its entirety). For a realistic assessment of computations times for the proxy signature keys, all computations were performed on a Raspberry-Pi3 IoT device to set a baseline comparison to the 4G ProSe security standard. Results in the example show communication in 5G.

Figure 1:
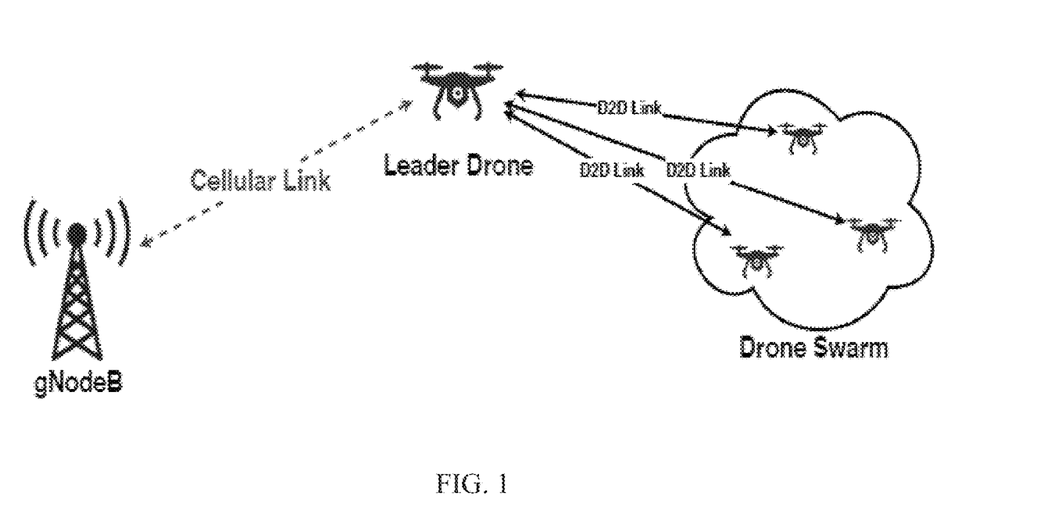
FIG. 1 is a schematic representation of a drone communication model, in accordance with certain embodiments of the subject invention.

Turning now to the figures, FIG. 1 shows a schematic representation of a drone communication model in accordance with certain embodiments of the subject invention. A Leader Drone may communicate via Cellular Link with a 5G core network at gNodeB. The Leader drone may also communicate with one or more drones in a Drone Swarm (e.g., via an individual D2D Link with each swarm drone in the Drone Swarm).

Figure 2:
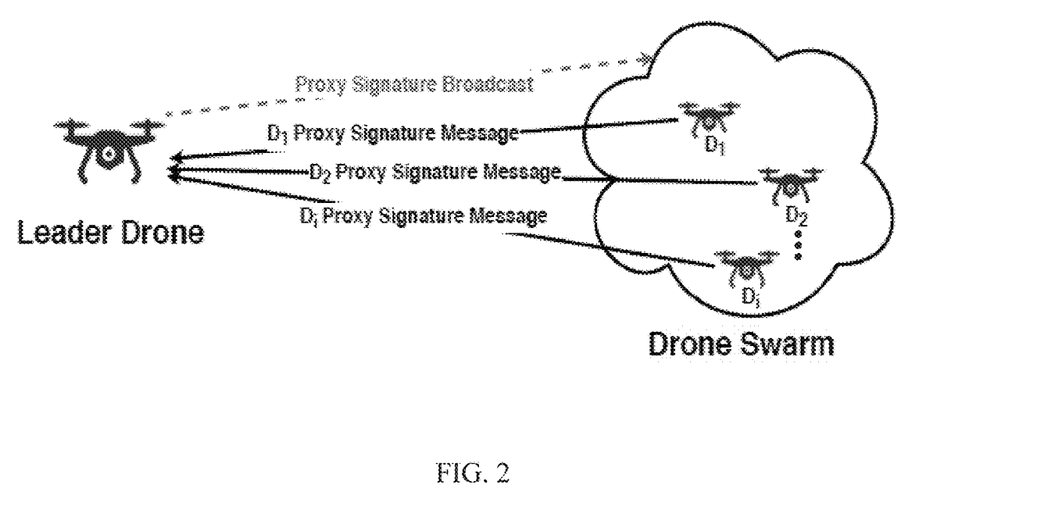
FIG. 2 is a schematic representation of drone authentication messages, in accordance with certain embodiments of the subject invention.

FIG. 2 shows a schematic representation of drone authentication messages in accordance with certain embodiments of the subject invention. The Leader Drone may authenticate to the swarm drones within a Drone Swarm (e.g., via a single Proxy Signature Broadcast including a proxy signature). Individual swarm drones may initiate authentication to a Leader Drone via proxy signature message. As seen in FIG. 2, swarm drone $D_1$ may send $D_1$ Proxy Signature Message to a Leader Drone, swarm drone $D_2$ may send $D_2$ Proxy Signature Message to a Leader Drone, and swarm drone $D_i$ sends $D_i$ Proxy Signature Message to a Leader Drone.

Figure 3A:
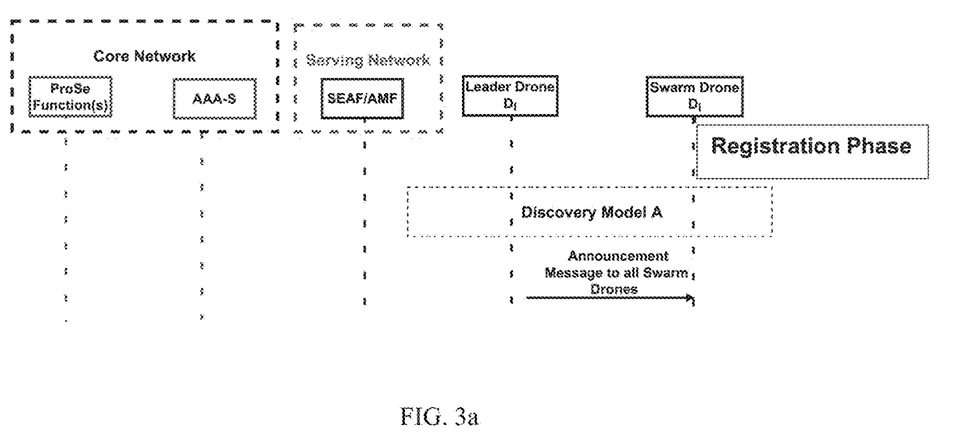
FIG. 3a is a schematic representation of Discovery Model A, where a leader drone may announce itself first, followed by other drones joining.

FIG. 3a is a schematic representation of Discovery Model A where a leader drone may announce itself first (e.g., via an announcement message broadcast to all swarm drones), and then other drones may join. In the process represented in FIG. 3a, the drones may talk to each other after the discovery phase, but this solution is not secure.

Figure 3B:
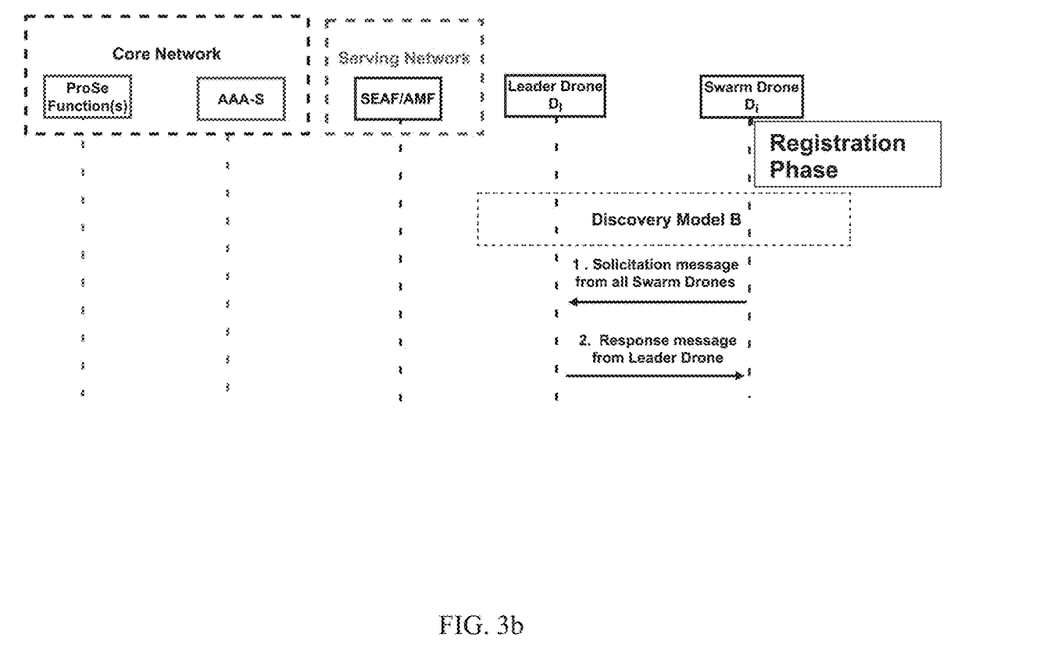
FIG. 3b is a schematic representation of Discovery Model B, where each drone sends a discovery message to nearby drones.

FIG. 3b is a schematic representation of Discovery Model B where each drone sends a discovery message to nearby drones (e.g., via a solicitation message from each swarm drone or from some or all drones in a swarm), and then the leader drone may send a response message. In the process represented in FIG. 3b, the drones may talk to each other after the discovery phase, but this solution is not secure.

Figure 3C:
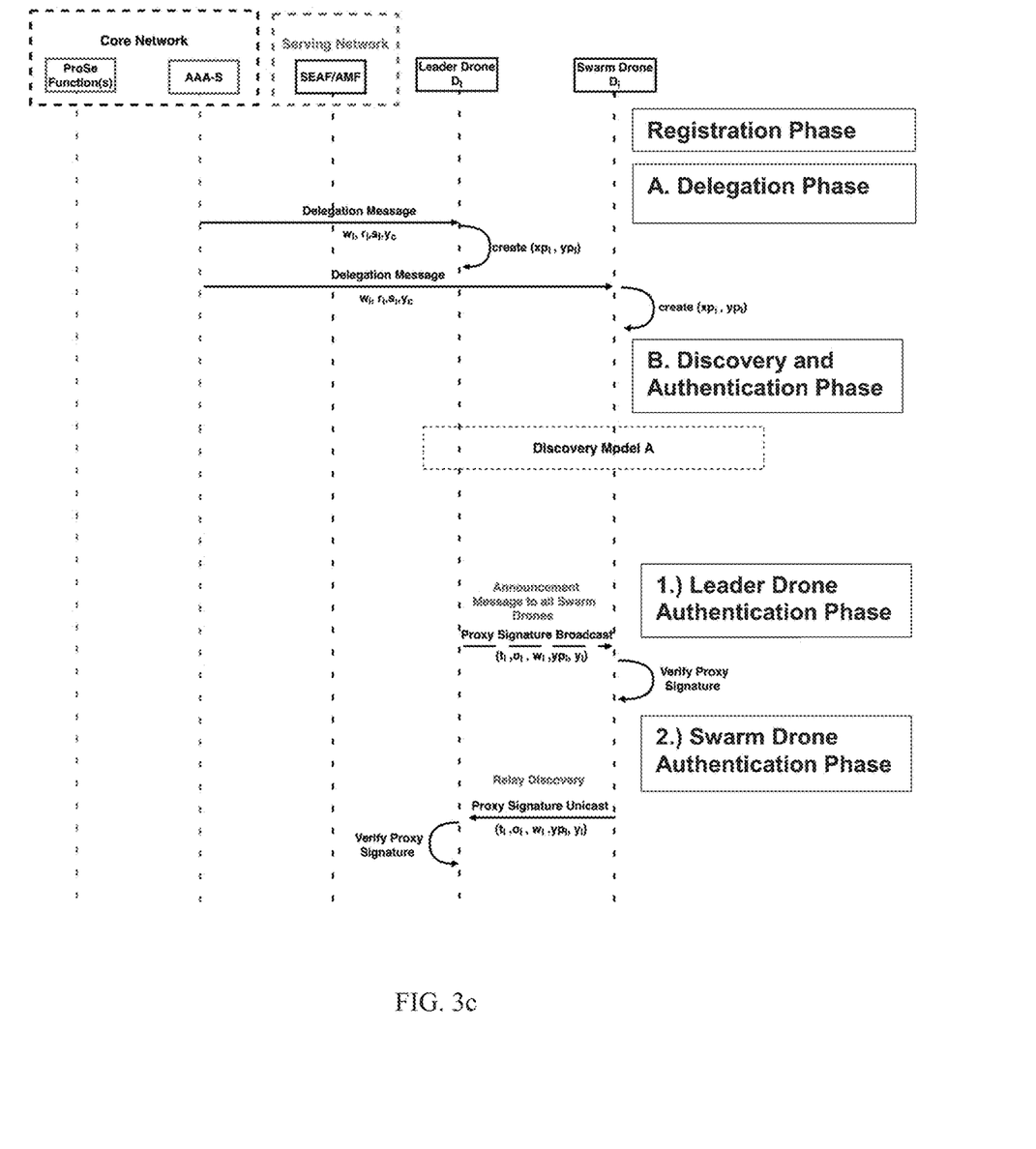
FIG. 3c is a schematic representation of proxy signature exchange messages using Discovery Model A within 5G Core Network, which can be referred to as a 5G Core, and the involved drones, in accordance with certain embodiments of the subject invention.

FIG. 3c is a schematic representation of proxy signature exchange messages using Discovery Model A within 5G Core and the involved drones in accordance with certain embodiments of the subject invention. The Core Network (e.g., 4G or 5G Core Network) may include ProSe Function(s) and Authentication Authorization and Access server (AAA-S). The Serving Network may include Security Anchor Function (SEAF) and Access & Mobility Management Function (AMF). At least one Leader Drone $D_l$ and at least one Swarm Drone $D_i$ may communicate through a Registration Phase, a Delegation Phase (A), a Discovery and Authentication Phase (B), a Leader Drone Authentication Phase (1), and/or a Swarm Drone Authentication Phase (2). In FIG. 3c, the Leader Drone makes an announcement message to all swarm drones with a Proxy Signature Broadcast ($t_1$, $\sigma_1$, $w_1$, $yp_1$, $y_1$), Swarm Drones verify the proxy signature and reply with relay discovery with a proxy signature unicast ($t_i$, $\sigma_i$, $w_i$, $yp_i$, $y_i$) before the Leader Drone can verify the swarm proxy signatures.

Figure 3D:
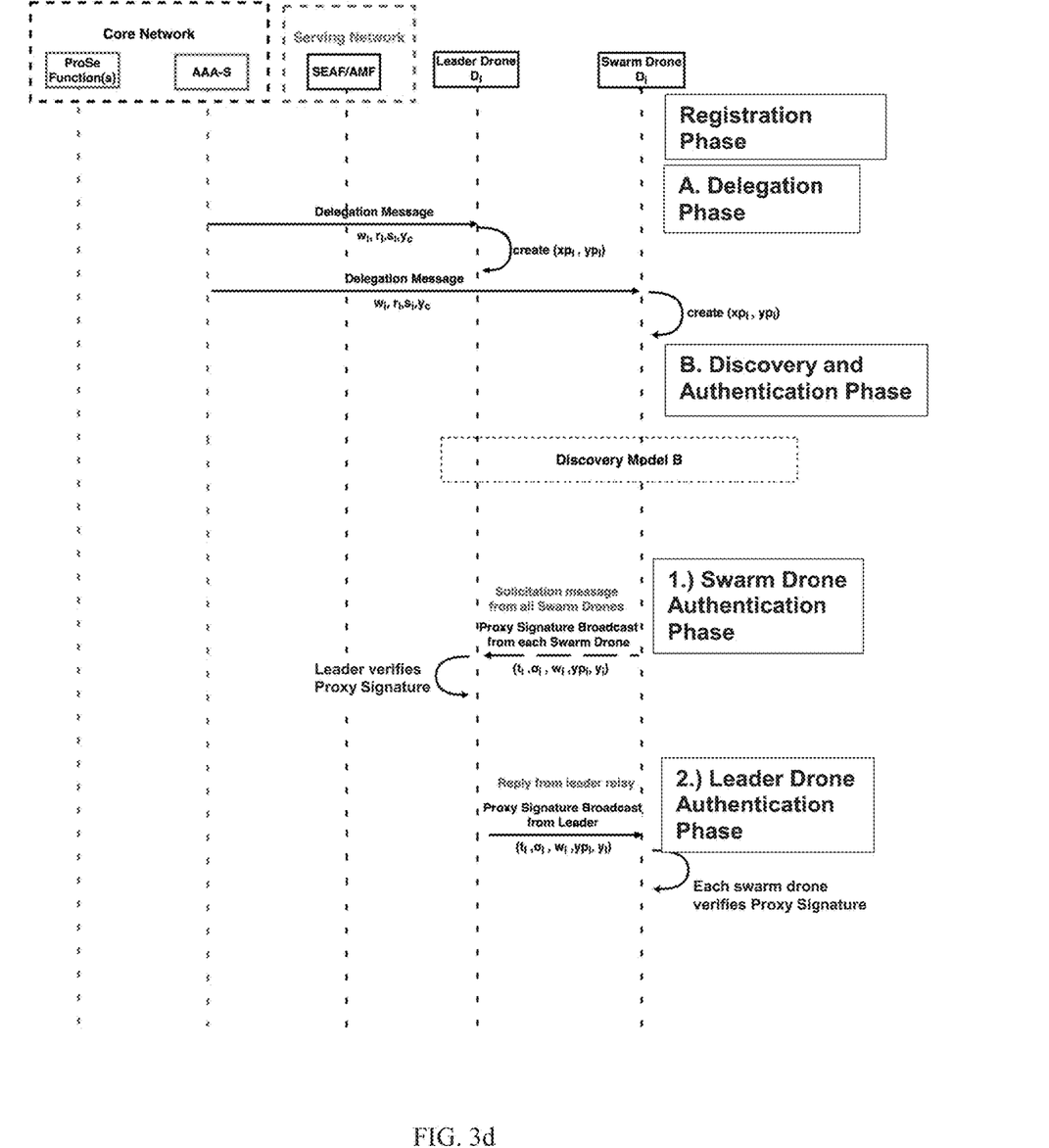
FIG. 3d is a schematic representation of proxy signature exchange messages using Discovery Model B within 5G Core and the involved drones, in accordance with certain embodiments of the subject invention.

FIG. 3d is a schematic representation of proxy signature exchange messages using Discovery Model B within 5G Core and the involved drones in accordance with certain embodiments of the subject invention. The Core Network (e.g., 4G or 5G Core Network) may include ProSe Function(s) and Authentication Authorization and Access server (AAA-S). The Serving Network may include Security Anchor Function (SEAF) and Access & Mobility Management Function (AMF). At least one Leader Drone $D_l$ and at least one Swarm Drone $D_i$ may communicate through a Registration Phase, a Delegation Phase (A), a Discovery and Authentication Phase (B), a Swarm Drone Authentication Phase (1), and/or a Leader Drone Authentication Phase (2). In FIG. 3d, the swarm drones make a solicitation message with a Proxy Signature Broadcast ($t_1$, $\sigma_1$, $w_1$, $yp_1$, $y_1$) from each swarm drone, The Leader Drone verify the proxy signatures and reply with relay discovery with a proxy signature broadcast ($t_1$, $\sigma_1$, $w_1$, $yp_1$, $y_1$) before the Swarm Drones can verify the swarm proxy signatures.

Figure 3E:
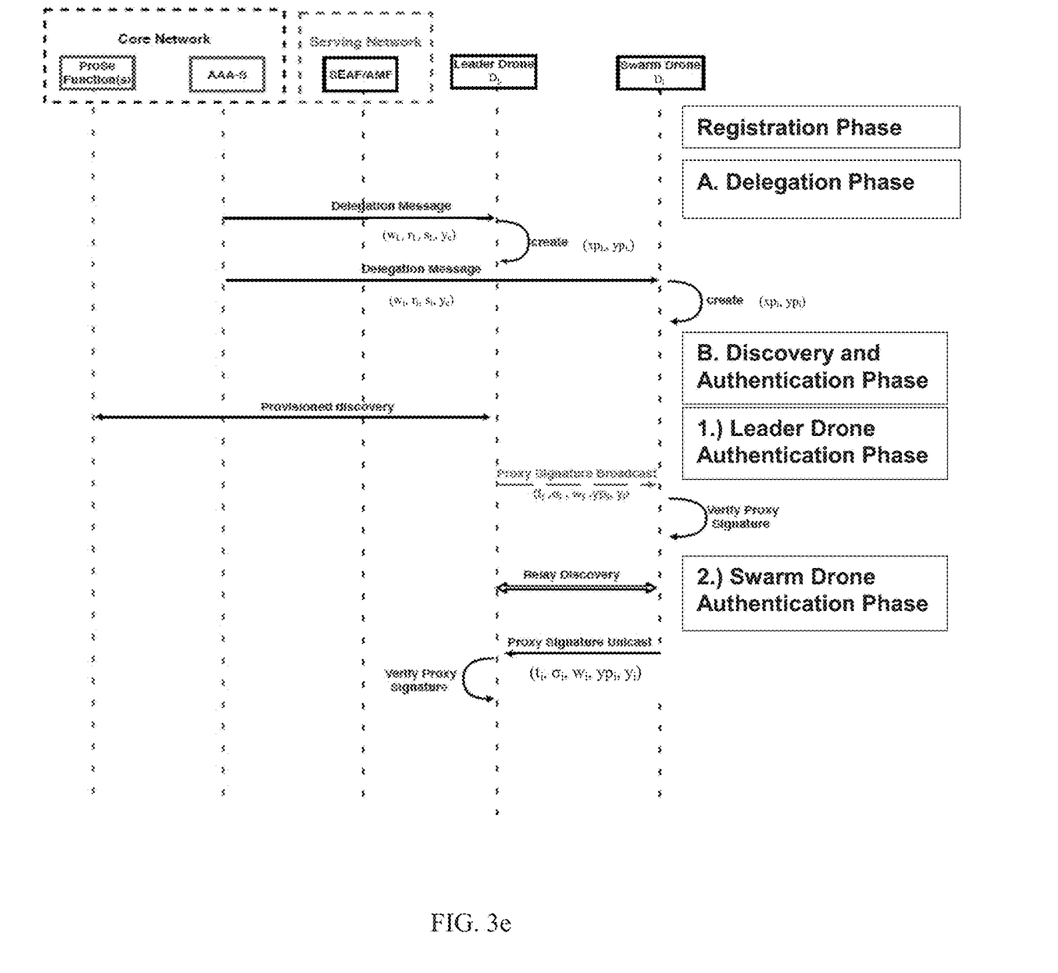
FIG. 3e is a schematic representation of proxy signature exchange messages within 5G Core and the involved drones, in accordance with certain embodiments of the subject invention.

FIG. 3e shows a schematic representation of proxy signature exchange messages within 5G Core and the involved drones in accordance with certain embodiments of the subject invention. The Core Network (e.g., 4G or 5G Core Network) may include ProSe Function(s) and Authentication Authorization and Access server (AAA-S). The Serving Network may include Security Anchor Function (SEAF) and Access & Mobility Management Function (AMF). At least one Leader Drone $D_l$ and at least one Swarm Drone D, may communicate through a Registration Phase, a Delegation Phase (A), a Discovery and Authentication Phase (B), a Leader Drone Authentication Phase (1), and/or a Swarm Drone Authentication Phase (2). Two-way Provisioned discovery messages are sent between Leader Drone $D_l$ and ProSe Function(s) within Core Network. A Delegation Message containing ($w_l$, $r_l$, $s_l$, $y_c$) is sent from AAA-S within Core Network to Leader Drone $D_l$. Leader Drone $D_l$ executes create ($xp_l$, $yp_l$).

Provisioned discovery refers to the fact that the Core network provides proxy signature material to the leader drone and others in advance of the deployment of the swarm. Provisioned discovery in this figure is not limited to a specific message but marks a stage ending.

With regard to Relay Discovery in this figure, Relay is the leader drone which will act as a bridge between the swarm drones and 5G core network. The Relay drone may be discovered by the swarm drones before they send their messages to it for relaying to 5G core.

Wazid et al. ("Design and analysis of secure lightweight remote user authentication and key agreement scheme in internet of drones deployment," IEEE Internet of Things Journal, vol. 6, no. 2, pp. 3572-3584, 2019; which is hereby incorporated herein by reference in its entirety) propose a lightweight authentication scheme for the internet of drones deployment utilizing an efficient one-way cryptographic hash function. Other designs have employed the elliptic curve certificate (ECC) for a legal drone digital identity proof (see, e.g., Teng, et. al, "Lightweight security authentication mechanism towards uav networks," in 2019 International Conference on Networking and Network Applications (NaNA), 2019, pp. 379-384); which is hereby incorporated herein by reference in its entirety). A survey on variant state-of-the-art solutions to tackle security and privacy challenges in D2D communication spanning across a variety of D2D prospects is provided by Haus et al. ("Security and privacy in device-to-device (d2d) communication: A review," IEEE Communications Surveys & Tutorials, vol. 19, no. 2, pp. 1054-1079, 2017; which is hereby incorporated herein by reference in its entirety). In Bera et al., ("Blockchain-envisioned secure data delivery and collection scheme for 5g-based iot-enabled internet of drones environment," IEEE Transactions on Vehicular Technology, vol. 69, no. 8, pp. 9097-9111, 2020; which is hereby incorporated herein by reference in its entirety), a blockchain-based secure framework for data management among a group of drones was disclosed. Some works aforementioned are general-purpose drone authentication for any network and may have limited application to the specific case of D2D communication in 5G. He et al. ("Designated verifier proxy blind signature scheme for unmanned aerial vehicle network based on mobile edge computing," Security and Communication Networks, vol. 2019, 2019; which is hereby incorporated herein by reference in its entirety) disclosed a designated verified proxy blind signature scheme for drone network based on Elliptic Curve Cryptography (ECC) that provides efficient computation in the context of assumptions and architecture that focus solely on computation calculations. Blind proxy signature is a proxy signature mechanism designed to maintain user privacy. Blind proxy signature only has the original signer signature and not the delegated/proxy signer signature. Embodiments of the subject invention provide a novel, advantageous, and powerful device authentication proxy signature with information about the proxy signer along with the original signer.

System Model

Certain embodiments of the subject invention employ a drone-to-drone communication model under a 5G cellular infrastructure network. The drones can communicate directly through D2D communication. Moreover, all drones may be initially registered as UE devices through the Security Anchor Function (SEAF)/Access and Mobility Management Function (AMF) in the network core for proper cellular communication. The primary 5G authentication protocols may be executed for all the drones before any communication attempts throughout the network. One of the drones (e.g., a leader drone) can act as a UE-to-Network relay to the 5G core network. The described communication model for an embodiment of 5G D2D drone communication is shown in FIG. 1. Each drone i may have a pair of public and private asymmetric keys: $y_i$ and $x_i$, respectively.

Proxy Signatures

Certain embodiments of the subject invention may use a proxy signature scheme (see e.g., Lee, et al., "Strong proxy signature and its applications," in Proceedings of SCIS, vol. 2001, 1 2001, pp. 603-608; which is hereby incorporated herein by reference in its entirety), where a proxy key pair depends on the signer private key for authentic information on the proxy signer's identity. In this model, the proxy signer's identity is protected using the node's authentic key pair $(x_i, y_i)$. This is considered a strong trusted proxy signature because it represents both original signer's in the form of a warrant wi and proxy signer's signatures (i.e., the node's private-public key pair $(x_i, y_i)$).

In order to demonstrate one non-limiting embodiment of a proxy signature scheme, let the 5G core network (i.e., the original signer) be node A and the authenticating drone (i.e., the proxy signer) be node B. First, node A generates a random number $K_A$ from a g generator of multiplicative subgroup $Z_q^*$ with order of large prime q, and hence, $K_A \in Z_q^*$. Then, node A computes two proxy parameters $r_A = g^{K_A}$ and $S_A = x_A h(m_w, w, r_A) + K_A$, where $x_A$ is A's private key, h( ) is a collision resistant hash function, and $m_w$ is A's signed warrant. The tuple $(r_A, s_A)$ is A's signature for $m_w$, where $(m_w, r_A, s_A)$ has to be sent secretly to node B. Next, once node B verifies the received tuple as $g^{s_A} = y_A^{h(m_w, w, r_A)} r_A$ it then generates the proxy signature keys as follows:

$$x_p = s_A + h(m_w, r_A) x_B \quad (1a)$$

$$y_p = (y_A y_B)^{h(m_w, r_A)} r_A \quad (1b)$$

By this method, Node B can authenticate itself to other nodes on behalf of the original signer A using the proxy signature keys $x_p$ and $y_p$.

5G ProSe Standard 4G and 5G Cellular networks allow UEs to establish independent D2D connections for data exchange. The current D2D standards for 4G and 5G networks are defined in 3GPP ProSe standards (TS 33.303) and (TR 23.752), respectively (each of which is hereby incorporated herein by reference in its entirety). ProSe is a D2D standard allowing LTE/5G devices to detect each other and to communicate directly. The ProSe standard comprises the ProSe discovery and the ProSe Direct Communication, which enables establishment of communication paths between two or more ProSe-enabled UEs. The 5G (TR 23.752) ProSe defines the following functions for D2D communication:

5G ProSe Direct Discovery: A procedure employed by a ProSe-enabled UE to discover other ProSe-enabled UEs in its vicinity by using only the capabilities of the two UEs with New Radio (NR) technology.

5G ProSe UE-to-Network Relay: A UE that provides functionality to support connectivity to the network for Remote UE(s). Certain non-limiting examples herein focus on this case, as shown in FIG. 1, where the leader drone represents the UE-to-Network relay. However, embodiments of the subject invention can also work for the ProSe Direct Discovery mode.

The current 3GPP ProSe standards (TS 33.303) under the 4G ProSe, includes the ability to use a UE node as a UE-to-network relay, provided connection establishment with the UE node requires an in-advance key exchange process. The nodes that will use ProSe services first must register with ProSe Function and then make a Key Request to ProSe Key Management Function (PKMF), both of which are unique units residing within the 4G core. PKMF will issue a symmetric key with an ID (e.g., a PKUK ID). Similarly, when a node acting as UE-to-network relay is contacted by a remote UE, it will need to make another Key Request to the PKMF for getting the same symmetric key corresponding to the PKUK ID. Both nodes may agree on the same symmetric key and move on to authenticate each other. Although the security mechanism for the ProSe is well defined for 4G/LTE, there is still no finalized security standard for the 5G standard yet see, e.g., G. support office, "3rd generation partnership project; technical specification group services and system aspects; study on system enhancement for proximity based services (ProSe) in the 5G system (5GS)," 3GPP TR 23.752 V0.3.0 Technical Specification (Release 16), Tech. Rep., 2020; which is hereby incorporated herein by reference in its entirety).

Attack Model

For evaluation of certain systems and methods of the subject invention, the following threats to the drones may be considered.

1) Malicious Leader Drone: A malicious drone can broadcast messages to other drones claiming to be a UE-to-network relay for them. In such cases, private data may be collected from the drones.

2) Replay Attack: A malicious drone sniffs the communication between other legitimate drones to maliciously transmit a repeated or delayed signature to verify itself to the leader drone.

Overview

As described under the ProSe security standard, the authentication solution is time-consuming and introduces additional message overhead. The ProSe security standard further requires maintaining the state information about all the keys. Embodiments of the subject invention provide a fast and scalable authentication mechanism with no pre-messaging to sustain IoT devices that may be resource-constrained (e.g., devices such as drones) and which also minimize the message count to ensure scalability for the 5G Core and to support an increased number of nodes.

Specifically, embodiments of the subject invention provide a proxy signature-based device authentication where the leader drone first authenticates itself to the swarm of drones by only broadcasting a proxy signature. Hence, other drones in the swarm initiate the authentication to this leader drone by using a similar proxy signature to be ready for communication, as shown in FIG. 2. In both cases, the original signer of these proxy signatures is the 5G Core (e.g., the elements that may replace PKMF from 4G). Therefore, the nodes authenticate themselves to the PKMF existing within 4G through the leader drone. The details of this process follow.

Registration and Delegation Phase

After the drones are registered and authenticated through 5G authentication services (e.g., a 5G-AKA mechanism as disclosed by Koutsos, "The 5g-aka authentication protocol privacy," in IEEE European Symposium on Security and Privacy (EuroS P), 2019, pp. 464-479; which is hereby incorporated herein by reference in its entirety), they are checked against their digital drone IDs to initiate a delegation phase for D2D communication. A specific slice function is triggered based on the drone IDs kept in a list by the network function operator. In the delegation phase, all these drones receive the needed parameters for the proxy signature creation. Those parameters are fetched from a specific server named Authentication Authorization and Access server (AAA-S) in the 5G core network, as shown in FIG. 3e.

In an embodiment, AAA-S has a private-public key pair $(x_c, y_c)$. The proxy signature keys are created for a drone $D_I$ by first generating a random number as a seed for the proxy signature parameters. The details of this key creation process are as follows:

Let g be a generator of a multiplicative subgroup of $z_p^*$ with order p. Then a random number $k_i \in_R Z_p^*$ is selected from this set. The proxy signature parameters are generated as follows:

$$r_i = g^{k_i},$$

$$s_i = x_c h(w_i, r_i) + k_i, \quad (2)$$

where, h( ) is a collision resistant hash function. In addition, as part of this proxy signature, the AAA-S creates a unique warrant $w_i$ for each drone $D_i$, as follows:

$$w_i = S(r_i, s_i), \quad (3)$$

where S( ) may be any digital signature function. Note that this warrant is specific to drone $D_i$ as it uses $(r_i, s_i)$.

The delegation parameters (e.g., the proxy parameters, the warrant, and the core network public key) are sent securely to the drone $D_i$ as a tuple of $(w_i, r_i, s_i, y_c)$. Embodiments may use the $K_{SEAF}$ key produced during the 5G primary authentication for this encrypted communication.

The leader drone $D_l$ that will act as a UE-to-Network relay receives a similar uniquely created tuple of $(w_l, r_l, s_l, y_c)$.

Discovery and Device Authentication Phase

The next phase after the registration and delegation phases is the discovery phase, where the drones can search for the other available UE-to-Network relay drones for D2D connection. This phase is done through the ProSe standard in the cellular network. FIG. 3e shows the 5G ProSe D2D discovery process. The ProSe standard has two models of discovery: Model A; and Model B. In Model A, the UE-to-network relay announces its presence, while in Model B, the UE/drone sends a discovery message to the nearest nodes. Certain authentication protocols according to the subject invention would work for both models. In discovery messages for both models, each drone (leader or not) attaches the proxy signature. Anyone who replies will attach its proxy signature as well. This protocol is described in two parts, as follows 1) Leader Drone Authentication: The leader drone message exchange for the proposed proxy signature authentication protocol is shown in FIG. 3e under the leader drone authentication phase.

The leader drone $D_l$ creates the proxy signature keys, $(xp_l, yp_l)$, using the delegation parameters as follows:

$$xp_l = s_l + h(w_l, r_l) x_l$$

$$yp_l = (y_c y_l)^{h(w_l, r_l)} r_l \quad (4)$$

The leader drone then creates the following signature:

$$\sigma_l = S(t_l, xp_l). \quad (5)$$

where $t_l$ is a timestamp nonce using its private key $xp_l$. Note that since $xp_l$ is only known by $D_l$, the proxy signature can be only created by a legitimate $D_l$.

The leader drone $D_l$ broadcasts this proxy signature (the dashed Proxy Signature Broadcast message in FIG. 3e) that contains the following tuple:

$$(t_l, \sigma_l, w_l, yp_l, y_l)$$

Then, each drone $D_i$ in the swarm receives the proxy signature and verifies the leader's proxy signature as follows:

$$V(t_l, \sigma_l, (y_c y_l)^{h(w_l, r_l)} yp_l) = \text{True}, \quad (6)$$

2) Swarm Drones Proxy Signature-based Authentication: Next, in response to the leader's broadcast signature, the swarm drones send a reply to be authenticated to the leader drone. The swarm drones authentication to the leader drone is shown in FIG. 3e under the swarm drone authentication phase.

Initially, each drone $D_i$ creates the proxy signature keys $(xp_i, yp_i)$, using the delegation parameters as follows:

$$xp_i = s_i + h(w_i, r_i) x_i,$$

$$yp_i = (y_c y_i)^{h(w_i, r_i)} r_i. \quad (7)$$

Next, each drone prepares a signed nonce with its proxy private key, $xp_i$ as follows:

$$\sigma_i = S(t_i, xp_i). \quad (8)$$

Next, after receiving the leaders broadcast message, the drone $D_i$ then sends the proxy signature message that contains the following tuple: $(t_i, \sigma_i, w_i, yp_i, y_i)$ in its reply.

Then, the leader drone $D_l$ verifies this proxy signature, as follows:

$$V(t_i, \sigma_i, (y_c y_i)^{h(w_i, r_i)} yp_i) = \text{True}, \quad (9)$$

where V( ) is a digital signature verification algorithm. Because both the leader drone and the drones in the swarm are already mutually authenticated, they can start message communication securely. The leader drone can create a symmetric key and send it to the other drones using its private key, to be used for message encryption, authentication, and integrity by methods known in the art.

Proxy Key Revocation

When asymmetric keys are used, there is a need for a key revocation mechanism if they are compromised. Revocation is the declaration for the existing proxy signature keys as obsolete (i.e., not valid anymore). In accordance with certain embodiments of the subject invention, the AAA-s in the core network can revoke $y_p$, which is the public proxy signature of a proxy drone B. Simultaneously with the leader drone verifying the proxy signature of B using its public proxy key $y_p$, the leader drone will also check whether this key is in a proxy revocation list. This revocation process is similar to the case of certificate revocation lists (CRLs) in usual public-key systems (see, e.g., Myers et al., ("X. 509 internet public key infrastructure online certificate status protocol-ocsp," RFC 2560, Tech. Rep., 1999; which is hereby incorporated herein by reference in its entirety).

Embodiments of the subject invention provide lightweight, fast, and secure drone authentication schemes for D2D communication under 5G networks, which are integrated easily into the current D2D ProSe standard. Proxy signatures replace the need for a direct connection with the core, as the nodes are authenticated through the authorized UE-to-Network relay node. An embodiment has been tested using the ns-3 5G implementation for D2D communication, and the evaluation of the authentication model indicated enhanced efficiency and feasibility as compared to the 4G Standard ProSe scheme (see the example below).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example: Security and Performance Analysis

Security Analysis

Considering first a Malicious Leader Drone Attack, in an embodiment of the subject invention D2D drone authentication utilizes information distributed by the core network itself through delegation. Hence, in order to join the network, a legitimate leader drone $D_l$ needs to show its valid and unique pair of proxy keys. The proxy keys are created based on the unique delegation parameters, $r_i$ and $s_i$, given by the SEAF/AMF serving network to the drone $D_l$. Moreover, a malicious leader drone $D_m$ needs to broadcast a proxy signature message that can be verified using the $D_m$'s proxy public key. However, because the delegation phase is held securely before the drones' release to its location, $D_m$ will fail to create its pair of the proxy keys since it does not have the unique delegation parameters.

Considering next a Malicious Swarm Drone Attack, in an embodiment of the subject invention, similar to leader drone, a legitimate swarm drone $D_i$ will need to show that it has a valid and unique pair of proxy keys created based on unique delegation parameters, $r_i$ and $s_i$, given by the SEAF/AMF serving network specifically to the drone $D_i$. As this will not be possible with a malicious drone, it will fail to authenticate itself to the leader drone.

Considering now a Replay Attack, in an embodiment of the subject invention, the protocol is also resilient against any replay or integrity attacks. A malicious adversary $D_m$ may attempt to impersonate a legitimate drone in the swarm $D_i$ by performing a replay attack where it replays a captured message from $D_i$ either for joining the network or claiming to be the leader drone. In both cases, $D_m$ broadcasts the whole proxy signature of drone $D_i$, $(t_i, \sigma_i, w_i, yp_i, y_i)$. Assume a verifier node receives this broadcast for the first time. This proxy signature will not pass the verification using Eq. 9 due to stale timestamp value in the message. Similarly, for replay attack of the leader drone broadcast message, the signature will not pass the verification at Eq. 6 in the same manner.

Experiment Setup

An embodiment of the subject invention was simulated using the ns-3 5G network simulator, which has recently implemented 5G RAN module (e.g., as described by N. Wireless and the University of Padova, "mmWave cellular network simulator," https://apps.nsnam.org/app/mmwave/, September 2018; which is hereby incorporated herein by reference in its entirety). A D2D implementation (see e.g., Diouf, "mmWave cellular network simulator," https://github.com/makhtardiouf/d2d, June 2017; which is hereby incorporated herein by reference in its entirety) for a node to node communication between drones was utilized, with 2 UE nodes representing the leader drone and one swarm drone, respectively. A server node was added, representing the AAA-S for the proxy authentication computation. Model A was selected, where the leader announces itself first, then the others join. The proxy signature parameters were pre-installed to the nodes. The system parameters for the ns-3 simulation used in the experiments are listed in Table I. A Raspberry-Pi3 IoT device was selected to mimic the drone's behavior for complexity convenience and realistic assessment.

TABLE 1

SIMULATION PARAMETERS

| Parameter | Value |
| --- | --- |
| Packet size | 56 Byte |
| Data rate | 30 Mb/sec |
| gNodeB distance | 300 m |
| drone to drone distance | 150 m |
| $K_{SEAF}$ size | 256 bit |
| Proxy Signature Hash Function | SipHash [20] |

Metrics and Baselines

In order to assess the proposed authentication mechanism overhead, a metric of total authentication time, including all the communication and computation delays during the authentication process, was selected. 4G ProSe D2D security as a centralized authentication model was selected as a baseline for comparison of this embodiment's D2D authentication mechanism.

Performance Results

Looking first at Drone Computational Overhead: The drones' computational delay experienced through the proxy signature authentication are listed in Table II. As seen, the total processing delay for drone D2D authentication is 2.012 milliseconds (ms), which includes all the proxy signature parameters and keys calculations. These results indicate that the computational complexity is almost negligible.

TABLE II

COMPUTATIONAL OVERHEAD

| Operation | Delay (msec) |
| --- | --- |
| SipHash Function | 0.13 |
| Proxy Private Key Creation $x_{pi}$&$x_{pl}$ | 1.02 |
| Proxy Private Key Creation $y_{pi}$&$y_{pl}$ | 0.992 |
| Total | 2.012 |

Looking next at Communication Overhead, the communication delays experienced between the drones are listed in Table III. The total delay for the proposed proxy signature authentication communication delay is 6.35 ms. Hence, the total delay for the proposed authentication mechanism after adding the computation delay is 8.362 ms. In comparison, the ProSe mechanism with a total authentication time of 12.46 ms, showing that the authentication mechanism of this embodiment is almost 33% faster. The reason for this advantage is due to the 4G-based ProSe connection to the core network as compared to the subject invention which does not require connection to the core network for authentication.

TABLE III

COMMUNICATION OVERHEAD

| Approach | Connection | Delay(msec) |
| --- | --- | --- |
| Proxy Signature | Discovery Phase | 2.32 |
| Proxy Signature | D2D Message Exchange | 4.03 |
| Proxy Signature | Total Communication Delay | 6.35 |
| 4G-based ProSe | Total Communication Delay | 12.46 |

Looking now at Impact of Background Traffic Delay, in order to investigate the impact of background traffic from other existing communication to the leader drone during the D2D drone authentication, uplink and downlink background traffic was simulated over the leader drone simultaneously while starting the D2D proxy authentication. The traffic frequency at each background node is set to 1 ms intervals between packet transmissions. As shown in Table IV, the total authentication communication delay based on the background traffic up to 40 nodes is within 0.8 microsecond (μs). Hence, under background traffic, the additional delay is negligible, which means no extra delay overhead on the proposed authentication.

TABLE IV

AUTHENTICATION DELAY UNDER VARYING BACKGROUND TRAFFIC

| Background Nodes | Delay (msec) |
| --- | --- |
| 1 | 6.350012 |
| 10 | 6.350064 |
| 20 | 6.350207 |
| 40 | 6.35089 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for distributed authentication of devices to create a local internet of things connected to a cellular network, the system comprising:

a first device having a first processor, a first device public key, and a first device private key;

a second device having a second processor, a second device public key, and a second device private key;

a first machine-readable medium in operable communication with the first processor and having first instructions stored thereon that, when executed by the first processor, perform the following steps:

1a) receiving, by the first processor from the cellular network, a first warrant, a first delegation parameter, and a core public key;

1b) calculating, by the first processor based on the first warrant, the first delegation parameter, and the core public key: a first public delegation key, a first private delegation key, a first timestamp, and a first signature; and 1c) sending, by the first device to the second device, a first proxy signature message comprising the first timestamp, the first signature, the first warrant, the first public delegation key, and the first device public key; and a second machine-readable medium in operable communication with the second processor and having second instructions stored thereon that, when executed by the second processor, perform the following steps:

2a) receiving, by the second processor from the cellular network, a second warrant, a second delegation parameter, and the core public key;

2b) calculating, by the second processor based on the second warrant, the second delegation parameter, and the core public key: a second public delegation key, a second private delegation key, a second timestamp, and a second signature;

2c) sending, by the second device to the first device, a second proxy signature message comprising the second timestamp, the second signature, the second warrant, the second public delegation key, and the second device public key;

2d) receiving, by the second device from the first device, the first proxy signature message comprising the first timestamp, the first signature, the first warrant, the first public delegation key, and the first device public key; and 2e) verifying, by the second device, the first proxy signature message, the first device being a leader drone having a primary direct connection to the cellular network, the second device being a swarm drone being configured to connect and authenticate directly with the leader drone, and the performing of steps 1a, 1b, 1c, 2a, 2b, 2c, 2d, and 2e by the first device and the second device, which is configured to connect and authenticate directly with the first device, for improving the efficiency of communication of the system.

2. The system according to claim 1, the first instructions when executed by the first processor further performing the following additional steps:

1d) receiving, by the first device from the second device, the second proxy signature message comprising the second timestamp, the second signature, the second warrant, the second public delegation key, and the second device public key; and 1e) verifying, by the first device, the second proxy signature message.

3. The system according to claim 2, further comprising:
a third device having a third processor, a third device public key, and a third device private key; and
a third machine-readable medium in operable communication with the third processor and having third instructions stored thereon that, when executed by the third processor, perform the following steps:

3a) receiving, by the third processor from the cellular network, a third warrant, a third delegation parameter, and the core public key;

3b) calculating, by the third processor based on the third warrant, the third delegation parameter, and the core public key: a third public delegation key, a third private delegation key, a third timestamp, and a third signature; and 3c) sending, by the third device to the first device, a third proxy signature message comprising the third timestamp, the third signature, the third warrant, the third public delegation key, and the third device public key.

4. The system according to claim 3, the third instructions when executed by the third processor further performing the following steps:

3d) receiving, by the third device from the first device, the first proxy signature message comprising the first timestamp, the first signature, the first warrant, the first public delegation key, and the first device public key; and 3e) verifying, by the third device, the first proxy signature message.

5. The system according to claim 4, further comprising:
a fourth device having a fourth processor, a fourth device public key, and a fourth device private key; and
a fourth machine-readable medium in operable communication with the fourth processor and having fourth instructions stored thereon that, when executed by the fourth processor, perform the following steps:

4a) receiving, by the fourth processor from the cellular network, a fourth warrant, a fourth delegation parameter, and the core public key;

4b) calculating, by the fourth processor from the values of the fourth warrant, the fourth delegation parameter, and the core public key: a fourth public delegation key, a fourth private delegation key, a fourth timestamp, and a fourth signature;

4c) sending, by the fourth device to the first device, a fourth proxy signature message comprising the fourth timestamp, the fourth signature, the fourth warrant, the fourth public delegation key, and the fourth device public key;

4d) receiving, by the fourth device from the first device, the first proxy signature message comprising the first timestamp, the first signature, the first warrant, the first public delegation key, and the first device public key; and 4e) verifying, by the fourth device, the first proxy signature message.

6. The system according to claim 5, the first instructions when executed by the first processor further performing the following steps:

1f) calculating, by the first processor, a first symmetric key;

1g) sending, by the first device to the second device, the first symmetric key;

1h) sending, by the first device to the third device, the first symmetric key; and 1i) sending, by the first device to the fourth device, the first symmetric key.

7. The system according to claim 6, each of the third device and the fourth device being a swarm drone, and
each of the third device and the fourth device being configured to connect and authenticate directly with the leader drone.

8. The system according to claim 7, the cellular network being a 5G cellular network.

9. The system according to claim 7,
each of the second device, the third device, and the fourth device having reduced, restricted, intermittent, or no direct connection to the cellular network.

10. The system according to claim 7, the leader drone being configured to communicate directly with the cellular network on behalf of each swarm drone, and
each swarm drone being configured to prioritize communication with the leader drone over direct communication with the cellular network.

11. A method for delegation-based distributed authentication of drones, the method comprising:

a) receiving, by a leader drone ($D_L$), a first delegation message;
b) creating, by $D_L$, a leader proxy signature private key ($xp_L$) and a leader proxy signature public key ($xp_L$);
c) receiving, by a swarm drone ($D_i$), a second delegation message;
d) creating, by $D_i$, a swarm proxy signature private key ($xp_i$) and a swarm proxy signature public key ($yp_i$);
e) sending, by $D_L$, a proxy signature broadcast message;
f) receiving, by $D_i$, the proxy signature broadcast message;
g) verifying, by $D_i$, the proxy signature broadcast message;
h) sending, by $D_i$, a proxy signature unicast message;
i) receiving, by $D_L$, the proxy signature unicast message; and
j) verifying, by $D_L$, the proxy signature unicast message,
$D_L$ and $D_i$ being part of a system for distributed authentication of devices to create a local internet of things connected to a cellular network,
$D_L$ having a primary direct connection to the cellular network,
$D_i$ being configured to connect and authenticate directly with $D_L$, and
the performing of steps a, b, c, d, e, f, g, h, i, and j, by $D_L$ and $D_i$, which is configured to connect and authenticate directly with $D_L$, for improving the efficiency of communication of the system.

12. The method according to claim 11, the first delegation message comprising a first unique warrant ($w_L$), a first pair of unique delegation parameters ($r_L$, $s_L$), and a core-network public key ($y_c$),
$D_L$ having a leader private key ($x_L$) and a leader public key ($y_L$),
both $xp_L$ and $yp_L$ being derived from the first delegation message,
$xp_L$ being derived from $w_L$, $r_L$, $s_L$, and $x_L$, and
$yp_L$ being derived from $w_L$, $r_L$, $y_c$, and $y_L$.

13. The method according to claim 12, the second delegation message comprising a second unique warrant ($w_i$), a second pair of unique delegation parameters ($r_i$, $s_i$), and the core-network public key ($y_c$),
$D_i$ having a swarm private key ($x_i$) and a swarm public key ($y_i$),
both $xp_i$ and $yp_i$ being derived from the second delegation message,
$xp_i$ being derived from $w_i$, $r_i$, $s_i$, and $x_i$, and
$yp_i$ being derived from $w_i$, $r_i$, $y_c$, and $y_i$.

14. The method according to claim 13, the proxy signature broadcast message comprising a first timestamp ($t_L$), a first unique proxy signature ($\sigma_L$), the first unique warrant ($w_L$), the leader proxy signature public key ($yp_L$), and the leader public key ($y_L$).

15. The method according to claim 14, $t_L$ being a timestamp nonce using $x_L$, and $\sigma_L$ being derived from $t_L$ and $xp_L$.

16. The method according to claim 15, the step of verifying, by $D_i$, the proxy signature broadcast message comprising application of a digital signature verification algorithm of the form:

$$V(t_L, \sigma_L, (y_c y_L)^{h(w_L, y_L)} yp_L) = \text{True}$$

where $h(w_L, y_L)$ is a collision resistant hash function.

17. The method according to claim 16, the proxy signature unicast message comprising a second timestamp ($t_i$), a second unique proxy signature ($\sigma_i$), the second unique warrant ($w_i$), the proxy signature public key ($yp_i$), and the swarm public key ($y_i$).

18. The method according to claim 7, $t_i$ being a timestamp nonce using $x_i$, and $\sigma_i$ being derived from $t_i$ and $xp_i$.

19. The method according to claim 18, the step of verifying, by $D_L$, the proxy signature unicast message comprising application of a digital signature verification algorithm of the form:

$$V(t_i, \sigma_i, (y_c y_i)^{h(w_i, y_i)} yp_i) = \text{True}$$

where $h(w_i, y_i)$ is a collision resistant hash function.

20. A system for distributed authentication of devices to create a local internet of things connected to a cellular network, the system comprising:
a first device having a first processor, a first device public key, and a first device private key;
a second device having a second processor, a second device public key, and a second device private key;
a first machine-readable medium in operable communication with the first processor and having first instructions stored thereon that, when executed by the first processor, perform the following steps:
1a) receiving, by the first processor from the cellular network, a first warrant, a first delegation parameter, and a 5G core public key;
1b) calculating, by the first processor based on the first warrant, the first delegation parameter, and the 5G core public key: a first public delegation key, a first private delegation key, a first timestamp, and a first signature; and
1c) sending, by the first device to the second device, a first proxy signature message comprising the first timestamp, the first signature, the first warrant, the first public delegation key, and the first device public key;
a second machine-readable medium in operable communication with the second processor and having second instructions stored thereon that, when executed by the second processor, perform the following steps:
2a) receiving, by the second processor from the cellular network, a second warrant, a second delegation parameter, and the 5G core public key;
2b) calculating, by the second processor based on the second warrant, the second delegation parameter, and the 5G core public key: a second public delegation key, a second private delegation key, a second timestamp, and a second signature;
2c) sending, by the second device to the first device, a second proxy signature message comprising the second timestamp, the second signature, the second warrant, the second public delegation key, and the second device public key;
2d) receiving, by the second device from the first device, the first proxy signature message comprising the first timestamp, the first signature, the first warrant, the first public delegation key, and the first device public key; and
2e) verifying, by the second device, the first proxy signature message;
the first instructions when executed by the first processor further performing the following steps:
1d) receiving, by the first device from the second device, the second proxy signature message comprising the second timestamp, the second signature, the second warrant, the second public delegation key, and the second device public key; and
1e) verifying, by the first device, the second proxy signature message comprising the second timestamp, the second signature, the second warrant, the second public delegation key, and the second device public key;

a third device having a third processor, a third device public key, and a third device private key;

a third machine-readable medium in operable communication with the third processor and having third instructions stored thereon that, when executed by the third processor, perform the following steps:
- 3a) receiving, by the third processor from the cellular network, a third warrant, a third delegation parameter, and the 5G core public key;
- 3b) calculating, by the third processor based on the third warrant, the third delegation parameter, and the 5G core public key: a third public delegation key, a third private delegation key, a third timestamp, and a third signature;
- 3c) sending, by the third device to the first device, a third proxy signature message comprising the third timestamp, the third signature, the third warrant, the third public delegation key, and the third device public key;
- 3d) receiving, by the third device from the first device, the first proxy signature message comprising the first timestamp, the first signature, the first warrant, the first public delegation key, and the first device public key; and
- 3e) verifying, by the third device, the first proxy signature message;

a fourth device having a fourth processor, a fourth device public key, and a fourth device private key; and a fourth machine-readable medium in operable communication with the fourth processor and having fourth instructions stored thereon that, when executed by the fourth processor, perform the following steps:
- 4a) receiving, by the fourth processor from the cellular network, a fourth warrant, a fourth delegation parameter, and the 5G core public key;
- 4b) calculating, by the fourth processor based on the fourth warrant, the fourth delegation parameter, and the 5G core public key: a fourth public delegation key, a fourth private delegation key, a fourth timestamp, and a fourth signature;
- 4c) sending, by the fourth device to the first device, a fourth proxy signature message comprising the fourth timestamp, the fourth signature, the fourth warrant, the fourth public delegation key, and the fourth device public key;
- 4d) receiving, by the fourth device from the first device, the first proxy signature message comprising the first timestamp, the first signature, the first warrant, the first public delegation key, and the first device public key; and
- 4e) verifying, by the fourth device, the first proxy signature message, the first instructions when executed by the first processor further performing the following steps:
- 1f) calculating, by the first processor, a first symmetric key;
- 1g) sending, by the first device to the second device, the first symmetric key;
- 1h) sending, by the first device to the third device, the first symmetric key; and
- 1i) sending, by the first device to the fourth device, the first symmetric key, the first device being a leader drone having a primary direct connection to the cellular network, the second device being a swarm drone being configured to connect and authenticate directly with the leader drone, the third device being a swarm drone being configured to connect and authenticate directly with the leader drone, the fourth device being a swarm drone being configured to connect and authenticate directly with the leader drone, each respective swarm having reduced, restricted, intermittent, or no direct connection to the cellular network, the leader drone being configured to communicate directly with the cellular network on behalf of each swarm drone, each swarm done being configured to prioritize communication with the leader drone over direct communication with the cellular network, the cellular network being a 5G cellular network, and the performing of steps 1a, 1b, 1c, 2a, 2b, 2c, 2d, and 2e, by the first device and the second device, which is configured to connect and authenticate directly with the first device, for improving the efficiency of communication of the system.

* * * * *